United States Patent
Dutton et al.

(10) Patent No.: US 8,255,430 B2
(45) Date of Patent: Aug. 28, 2012

(54) SHARED NAMESPACE FOR STORAGE CLUSTERS

(75) Inventors: James E. Dutton, Spicewood, TX (US); Laura Arbilla, Auston, TX (US); James B. Casey, Jr., Austin, TX (US); James M. Morrison, Austin, TX (US)

(73) Assignee: Caringo, Inc., Austin, TX (US)

( * ) Notice: Subject to any disclaimer, the term of this patent is extended or adjusted under 35 U.S.C. 154(b) by 372 days.

(21) Appl. No.: 12/546,104

(22) Filed: Aug. 24, 2009

(65) Prior Publication Data

US 2010/0070515 A1    Mar. 18, 2010

Related U.S. Application Data

(60) Provisional application No. 61/091,822, filed on Aug. 26, 2008.

(51) Int. Cl.
    *G06F 17/00* (2006.01)
(52) U.S. Cl. ........ 707/807; 707/804; 707/803; 707/795; 707/791; 707/737
(58) Field of Classification Search .................. 707/960, 707/804, 807, 803, 795, 793, 791, 737
    See application file for complete search history.

(56) References Cited

U.S. PATENT DOCUMENTS

| | | | |
|---|---|---|---|
| 5,978,791 | A | 11/1999 | Farber et al. |
| 6,415,280 | B1 | 7/2002 | Farber et al. |
| 6,928,442 | B2 | 8/2005 | Farber et al. |
| 7,505,970 | B2 * | 3/2009 | Adya et al. ............................ 1/1 |
| 7,802,310 | B2 | 9/2010 | Farber et al. |
| 7,945,539 | B2 | 5/2011 | Farber et al. |
| 7,945,544 | B2 | 5/2011 | Farber et al. |
| 7,949,662 | B2 | 5/2011 | Farber et al. |
| 8,001,096 | B2 | 8/2011 | Farber et al. |
| 2004/0172421 | A1 | 9/2004 | Saito et al. |
| 2005/0015761 | A1 | 1/2005 | Chang et al. |
| 2007/0055703 | A1 | 3/2007 | Zimran et al. |

OTHER PUBLICATIONS

PCT International Search Report; App. No. PCT/US09/55025; dated Oct. 6, 2009.
Written Opinion of International Searching Authority; App. No. PCT/US09/55025; dated Oct. 6, 2009.

* cited by examiner

*Primary Examiner* — Sana Al Hashemi
(74) *Attorney, Agent, or Firm* — Beyer Law Group LLP

(57) ABSTRACT

Any client application uses a namespace application to resolve its pathname in order to reference a computer file. Computer files are stored in a fixed-content storage cluster and are accessed by retrieving a unique identifier for the computer file using the namespace application. Any type of pathname scheme from any client application is supported by the namespace. The namespace application uses a bindings table to record bindings between objects including the start date and end date for each binding, and direction and separator data used in the pathname scheme. An attribute table in the namespace keeps track of each attribute and its value for each object of the namespace including a start date and an end date for each attribute. The namespace provides syntactic generality in that any pathname scheme of a client application can be resolved to identify a unique computer file in the storage cluster. The namespace may be shared between applications because when one application modifies a file or its attributes using the namespace, another application using a different pathname scheme has access to the exact same data and modifications. The namespace provides a near instantaneous continuous backup for computer files in the storage cluster because of the use of start date and end dates for the bindings and attributes.

18 Claims, 17 Drawing Sheets

Bindings Table

| Context ID | Name | Object ID | Start Date | End Date | Direction | Separator | |
|---|---|---|---|---|---|---|---|
| 1 | A | 2 | 08:34:16 | ∞ | left | / | |
| 1 | B | 3 | 08:34:17 | ∞ | left | / | |
| 3 | X | 4 | 08:34:18 | ∞ | left | / | |
| 2 | Y | 4 | 08:34:19 | ∞ | left | / | |

Attributes Table

| Object ID | Attribute Name | Value | Start Date | End Date | |
|---|---|---|---|---|---|
| 4 | UUID | F84B91CD | 08:34:18 | ∞ | |
| 4 | Mode | | 08:34:18 | ∞ | |
| 4 | User ID | | | | |
| 4 | Group ID | | | | |
| 6 | . . . . | . . . . | . . . . | . . . . | |

Name Graph Example

SHARED NAMESPACE FOR STORAGE CLUSTERS

CROSS-REFERENCE TO RELATED APPLICATIONS

This application claims priority of U.S. provisional patent application No. 61/091,822 filed Aug. 26, 2008 entitled "Shared namespaces in RAIN Storage Clusters," which is hereby incorporated by reference.

FIELD OF THE INVENTION

The present invention relates generally to namespaces. More specifically, the present invention relates to a namespace that is shared between client applications accessing a storage cluster.

BACKGROUND OF THE INVENTION

Prior art content-addressable storage applications return a unique identifier to the managing application (or user) in exchange for receiving and storing a digital object (such as a computer file). Typically, this unique identifier is the result of a hash function performed on the contents of the digital object (such as a lengthy hexadecimal string) or is a unique random number associated with that digital object. It is then up to the managing application (or user) to decide what to do with that unique identifier: where to store it, how to maintain it, and how to retrieve it when the digital object stored in the content-addressable storage must be retrieved.

Needless to say, keeping track of a 128-bit (for example) unique identifier can be difficult for a user and problematic for a managing application accustomed to using its own pathname scheme. Moreover, various applications may wish to reference digital objects in storage using different pathname schemes, but cannot. And, different applications desiring to share and access the same digital object cannot do so without each managing a lengthy hexadecimal string.

Furthermore, while many techniques exist for backing up computer files and reverting to prior states in a computer system, most only provide a prior state at discrete times. For example, the "Time Machine" feature available on computers from Apple, Inc. automatically makes incremental backups every hour—copying just the files that have changed since the last backup. But, this type of backup is only available at discrete checkpoints (every hour); it is not possible to determine the state of the computer system between hours if files have been changing.

Currently, many specific namespaces exist such as: DNS that maps host names to IP addresses; file systems that map pathnames to individual files; e-mail systems that map e-mail addresses to individual electronic mailboxes; and Web servers that map Universal Resource Locators (URLs) and Universal Resource Identifiers (URIs) to Internet content. Unfortunately, none of these prior art namespaces address the problems identified above and an improved namespace and techniques are desired.

SUMMARY OF THE INVENTION

To achieve the foregoing, and in accordance with the purpose of the present invention, a namespace and associated methods are disclosed that address the above problems in the prior art.

The present invention provides the general capability to map a symbolic user-readable name to a unique identifier in fixed-content storage (for example) that identifies a digital object. In the context of a file system, this enables a user or managing application to refer to digital objects (such as files) by a symbolic name or by a pathname instead of by a 128-bit number. Thus, digital objects stored in the fixed-content storage can now be given more useful symbolic names and can be manipulated with a file system (for example). The present invention guarantees that a fully resolved pathname is unambiguous and refers to, at most, a single digital object in the fixed-content storage.

The namespace of the present invention is general enough that it can represent host names, URIs, URLs, hierarchical file names, e-mail addresses, and nearly any symbolic name, regardless of syntax. As with the file system example above, preferably the managing application guarantees that a pathname is unambiguous. Thus, the present invention provides a novel namespace with universal mapping capabilities: any client application (file system, e-mail program, etc.) can store and retrieve digital objects using its own special pathname scheme without needing to manage lengthy unique identifiers. The namespace supports file names from different file systems, URLs, e-mail addresses, etc., all of which use different formats for identifying digital objects, and thus provides syntactic generality.

The namespace of the present invention allows sharing of digital objects between any number of different systems and clients. Different types of software applications may access the same digital object in a storage cluster using their own special pathname and not only be assured that the correct digital object is being accessed, but also that other software applications can view any changes made to the metadata of the digital object (or to the digital object itself). A variety of clients and protocols are supported such as CIFS, NFS, FTP, HTTP-Web, etc.

The namespace also provides the capability to attach start date and end date values to each name binding and attribute. Each binding or attribute includes a "start date" and an "end date" indicating when the object (or attribute) came into existence and when it was deleted or changed. With these values, once data is stored in a fixed-content RAIN cluster (for example) and the identifiers for the objects are stored in the namespace, manual backups are no longer required. Any user, not just an administrator, can roll the clock backward to see what a file, folder, or file system looked like at any moment in the past. Therefore, the namespace also provides the capability for a "continuous backup" of digital objects, unlike the prior art which only provides backup capabilities at discrete times in the past.

The namespace enforces certain constraints that collectively guarantee unambiguous fully qualified path names. Within a given name context, a simple name can only be used once in any given timescape to refer to a single digital object. This simple rule is sufficient to guarantee that a given fully-qualified path name will refer to at most one digital object in the present or at any moment in the past. However, a given digital object may have many, infinitely many perhaps, fully qualified path names that refer to it.

In general, any file system (or other collection of digital objects) can be implemented as a fixed-content storage cluster (such as a redundant array of independent nodes, or RAIN) plus the general namespace of the present invention. The namespace thus allows humans to assign symbolic, structured names to stored objects in a fixed-content cluster, and then retrieve the object later by name. For example, a Linux file system built as a combination of fixed-content storage and the namespace of the present invention may be used to hold hierarchical file names.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As mentioned above, the present invention applies to digital objects, i.e., any type of information represented in digital form. For example, the present invention is applicable to any electronic representation of information such as a computer file, a group of files, a group of file identifiers, or other collections of data or database information. Such other collections of data include frames or clips from digital audio or video streams, digital photographs, scanned paper documents, voice messages, CAD/CAM designs, MRI or X-ray data, streams from message records or files, log entries from audits or status logs of systems, e-mail archives, check images, etc. The term "computer file" is often used herein to encompass any electronic representation of the aforementioned types of information.

As known in the art, a namespace is an environment created to hold a logical grouping of unique identifiers or symbols. Typically, computer storage devices and modern computer languages provide support for namespaces. Storage devices can use directories (or folders) as namespaces. This use allows two files with the same name to be stored on the device so long as they are stored in different directories. The present invention uses a namespace in conjunction with a fixed-content storage cluster as described below to achieve many advantages.

Figure 1:
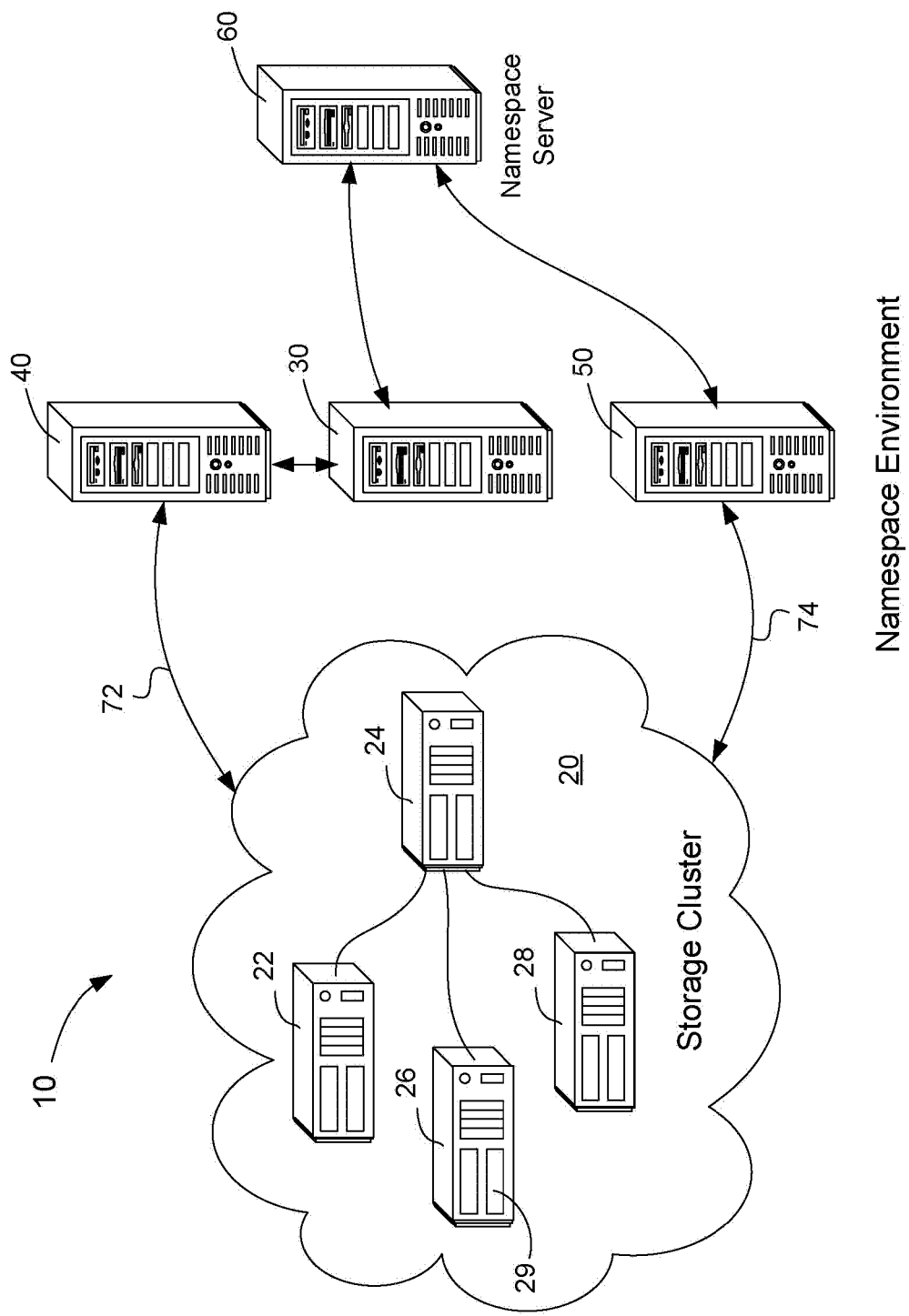
FIG. 1 illustrates a suitable computing environment for operation of the present invention.

FIG. 1 illustrates a suitable environment 10 for operation of the present invention. The present invention may be implemented using any suitable computer hardware and software; namespace environment 10 illustrates one particular embodiment. Shown is a storage cluster 20 including any number of computer nodes 22-28. Preferably, each node includes a CPU, an operating system, communication links to the other nodes (or, to a least a central router), and any number of internal hard disk drives 29. Cluster 20 is typically a fixed-content storage cluster, meaning that it is used for backups, long-term storage, archiving, etc., and is not typically used for day-to-day access to computer files. Often referred to as WORM (write once, read many) storage, this means that once a computer file or digital object is written to the cluster it cannot be changed. (Of course, a modified version of the computer file may also be stored within the cluster.) Cluster 20 may be implemented as a redundant array of independent nodes (a RAIN) meaning that each node runs its own operating system and makes independent decisions about storage within the cluster. Storage clusters may be built upon blades, towers, personal computers and servers. Alternatively, a multi-core processor within a single computer box may support a virtual storage node running on each core. In one particular RAIN embodiment, each node is a 1 U server with approximately 1 terabyte of serial ATA disk storage capacity with standard Ethernet networking. Each node may be physically interconnected using an IP-based LAN, MAN or WAN.

In one embodiment, storage cluster 20 is implemented using the CAStor content storage software available from Caringo, Inc. of Austin, Tex., and any suitable computer hardware. In this embodiment, typically computer node 24 serves as a router for routing communication between nodes 22, 26 and 28 which store the digital objects. In this embodiment, storage cluster 20 is fixed-content storage and each digital object is uniquely addressed within the cluster by a random number (a universally unique identifier, or UUID) that has been generated for that digital object using a random number generator. The contents of each digital object are verified using a hash function. A software application receives the UUID when storing a digital object in the cluster and retrieves that digital object by supplying the UUID to the cluster. Software applications communicate with a CAStor cluster (over communication links 72 and 74, for example) using standard HTTP 1.1, and more specifically, using a simplified subset of the standard called Simple Content Storage Protocol (SCSP). Using this standard interface, applications such as electronic mail, enterprise content management, health care applications, Web 2.0, etc., may access the CAStor storage cluster. Further, direct HTPP access is available for browsers, JAVA, Python, C++, and other software environment. Standard file access to the storage cluster is available through the Content File Server (CFS) software product also available from Caringo, Inc. CFS is a Linux file system that supports all the major file protocols such as CIFS, NFS, FTP, WebDAV, Macintosh, Linux, etc. Using HTTP 1.1, CFS supports these standard file protocols in storing and retrieving computer files to the storage cluster.

In another embodiment, storage cluster 20 is implemented using the Centera hardware and software available from EMC Corporation. In this embodiment, storage cluster 20 is fixed-content, content-addressable storage and each digital object is uniquely addressed within the cluster by a hash value (a universally unique identifier, or UUID) that has been calculated for that digital object using a hash function. A software application receives the UUID when storing a digital object in the cluster and retrieves that digital object by supplying the UUID to the cluster.

Computers 30, 40 and 50 host client applications or server software that use the namespace server 60 to access storage cluster 20. Of course, computers 40 and 50 may also access storage cluster 20 without the use of namespace server 60 if desired. In this illustration, a software client application on computer 50 uses a namespace available on namespace server 60 in order to store a digital object within storage cluster 20, manage that digital object, and retrieve it using a pathname scheme preferred by that client application. Alternatively, a client application on computer 40 utilizes a server application on computer 30 in order to interface with the namespace server 60 for digital object storage, management and retrieval. Of course, a client application may be running on the same physical computer in which the namespace is running.

Figure 2:
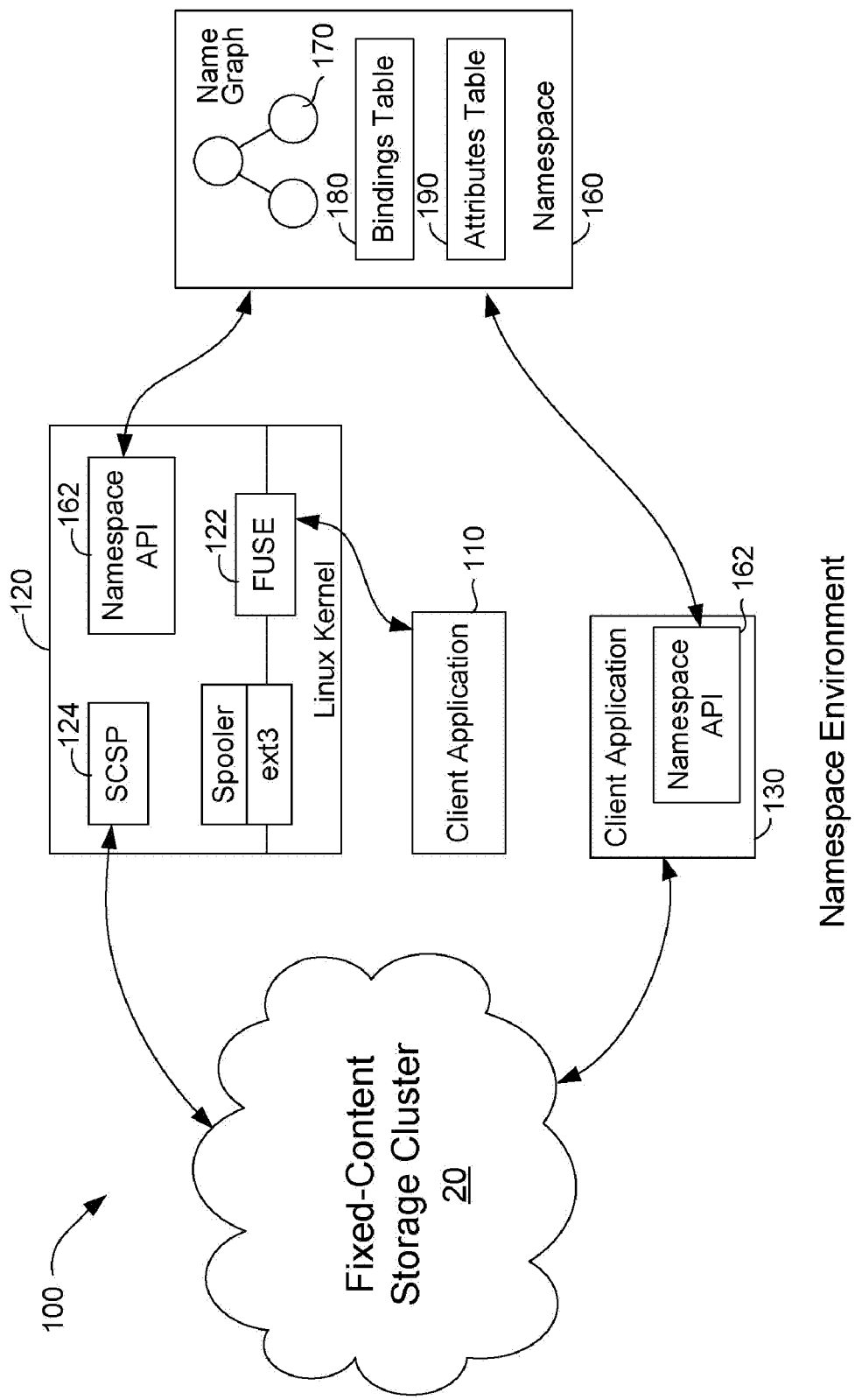
FIG. 2 illustrates an alternate view of the namespace environment.

FIG. 2 illustrates an alternate view 100 of the namespace environment. Shown conceptually is a fixed-content storage cluster 20 that may be implemented using any suitable hardware and software. Preferably, cluster 20 stores a digital object and returns a unique identifier or a universally unique identifier, and retrieves the digital object when such identifier is presented to it. Software applications 110, 120 and 130 run on any suitable computer (such as one or more of computers 30-50) and communicate with cluster 20 using any suitable communications link. Client applications 110 and 130 are any suitable software application designed to store, manage and retrieve digital objects in cluster 20 through the use of namespace 160. Client application 110 uses software application 120 to interface with namespace 160 and is any suitable client software such as a file system. In this embodiment, application 120 is the Content File Server software available from Caringo, Inc. Application 120 includes the SCSP interface 124, FUSE open source software module 122 and the namespace API 162 which is described below. Client application 130 also includes the namespace API 162 and communicates directly with the namespace 160. Application 130 is any suitable software application such as word processing, electronic mail, a user application, etc. Namespace 160 is a software module executing on namespace server 160 and includes a bindings table 180, an attributes table 190 as well as symbolically a name graph 170. Name graph 170 is not graphically represented within the namespace, but exists by virtue of bindings table 180; various name graphs will be used below to explain the invention.

A General Namespace

In simplest terms, a namespace is a mapping of symbolic names (strings) to objects. Strictly speaking, the namespace does not concern itself with the structure, type, or other attributes of the objects themselves, only their fundamental identity, represented as an objectID (or serial number). All that is required by the namespace is that each distinct object in the namespace has its own objectID. In general, a given object has exactly one objectID, although that object may have many name bindings referring to it. Every simple name in the namespace, except for the root, is understood in the context of some object. Each object can serve as a naming context for additional names, and all names within a given context are constrained to be different from one another. A namespace is logically a collection of triples, (object1, name, object2), which means, within the context of object1 the given name refers to object2. This is called a name binding.

Figure 3:
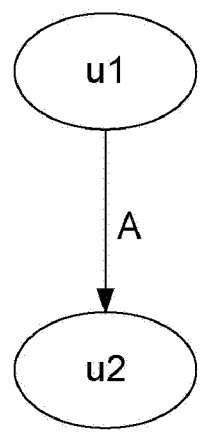
FIG. 3 is a graphical way of representing that in the context of the object u1, the name "A" refers to object u2.
Figure 4:
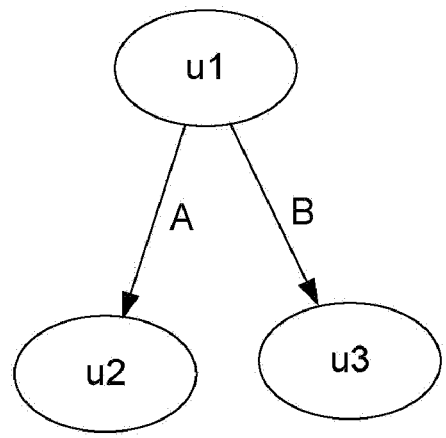
FIG. 4 illustrates that an object may have names for many other objects.
Figure 5:
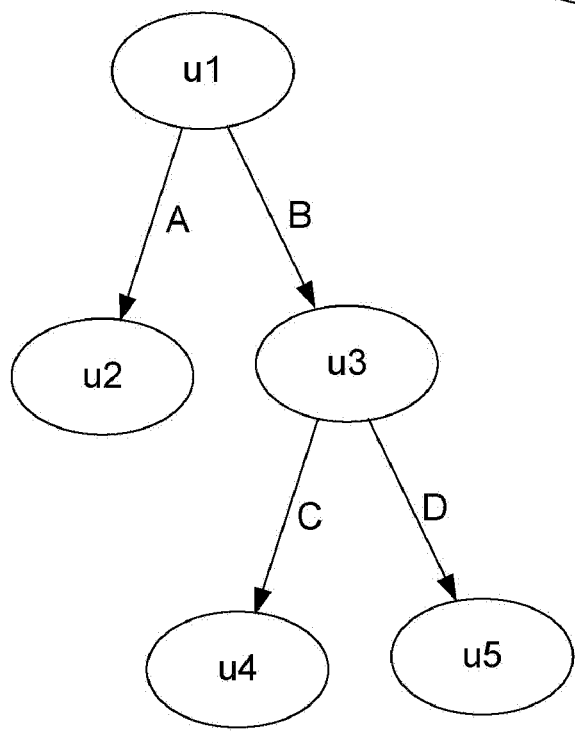
FIG. 5 illustrates that the objects of FIG. 4 may have names for other objects.

One way to visualize the totality of name mappings in a namespace is to think of them as a directed graph. The simplest possible namespace is a naming relationship between two distinct objects. Viewed as a directed graph, it might look like FIG. 3. This figure is a graphical way of representing the following: in the context of the object u1, the name "A" refers to object u2. An object may have names for many other objects as shown in FIG. 4. And, those objects may have names for other objects as shown in FIG. 5. Nodes in a namespace graph are referred to as "objects" and, as mentioned, the edges are referred to as "name bindings" or simply "bindings."

Figure 6:
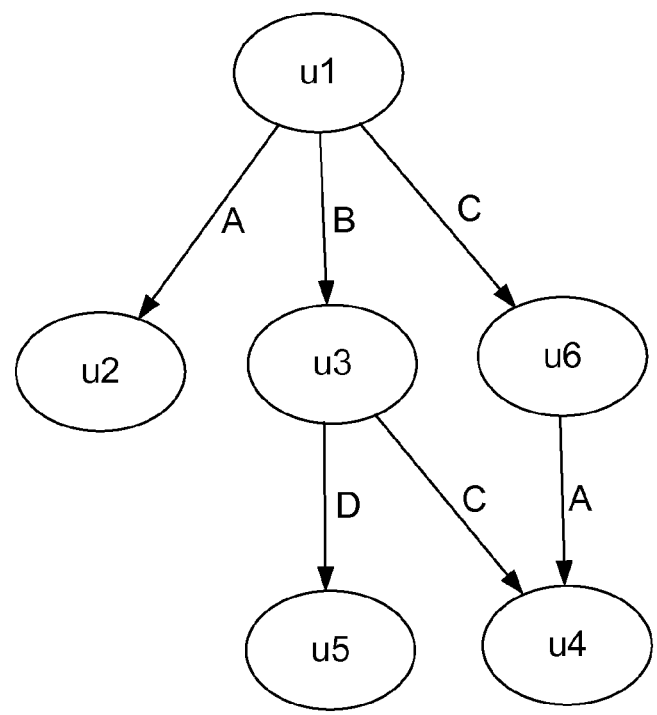
FIG. 6 illustrates that the same object may have two or more names.
Figure 7:
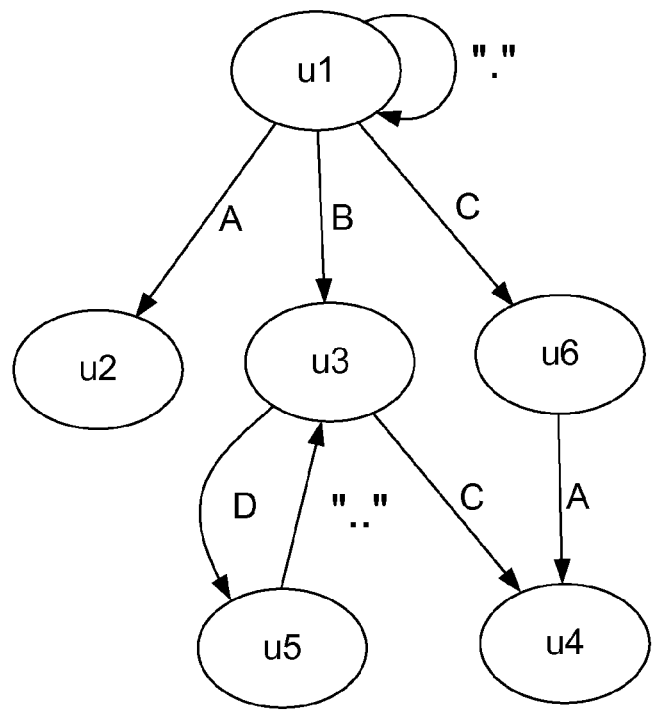
FIG. 7 illustrates that the object u1 has a name for itself, "." and that u5 refers to its parent as "..".

This begins to look like a traditional file system directory hierarchy, and indeed that is the most important application of a namespace, to allow a file system to store and resolve file pathnames. Note, however, that file system directory structures are not strictly hierarchical. There are hard and soft links that allow the same object to have two or more names as shown in FIG. 6. In this namespace, the object u4 is named "C" in the context of u3, but it is named "A" in the context of u6. Note that individual names (e.g., "A") need not be distinct across the entire namespace. Within a context, all the names are different. In namespaces, as in file systems, even cycles are allowed in the graphs. For example, the object u1 has a name for itself, "." and u5 refers to its parent as ".." reminiscent of the Unix conventions as shown in FIG. 7.

A namespace has a single, distinguished root node from which all unqualified names are resolved. This, along with some syntactic delimiter, allows one to use fully qualified path names to identify any object in the namespace graph. Assuming u1 is the root node in the above graph of FIG. 7 and "/" is the delimiter, the following path names would resolve as follows: B/D=>u5; B/C=>u4; C/A=>u4; ./././B/D/../C=>u4.

Different client applications may use different parts of the namespace graph. For example, a file system implementation could mount a file system starting at "filesystems/linux/app1" or "filesystems\windows\app2".

Namespace Application Programming Interface

The namespace may be implemented by one or more computer servers in a way that allows for concurrent access by many client applications. Namespace locks (see below) are provided for the convenience of client applications. These locks, however, are completely optional with respect to the namespace itself because each of the primitive namespace operations listed above maintains the ACID properties (atomicity, consistency, isolation and durability) of the overall namespace at all times. In the API definitions below, it is understood that all path parameters are fully qualified path names, emanating from the root node of the namespace. Simple names are those of the objects in a given context. Path names are constructed from simple names by using the separator and pathdir of the various contexts along the path. The following atomic functions are implemented by the namespace.

API Write Operations namespace(name [,separator] [,pathdir])

This function constructs a new namespace and root node called name. The optional parameters separator and pathdir can be used as defaults when resolving and constructing path names. (See the description of pathnames below.) If no separator or path traversal direction parameters are provided, the namespace will use the separator "/" and the path traversal direction "left" by default.

bind(contextPath, name [,separator] [,pathdir])

This function creates a new name binding in a given context. It fails if: the contextPath does not exist, the (contextPath, name) pair already exists in the present timescape, or if the name contains the separator for this context.

unbind(path)

This function deletes a name binding in the present timescape. It fails if path does not exist.

alias(path, contextPath, name)

This function copies a binding to a new one. Future changes to either are completely independent. It fails if: source path does not exist, context does not exist, name already exists in context, the name contains the separator for this context, or if the source and destination paths are in different namespaces.

link(path, contextPath, name)

This function creates a link to an existing object. It has the same semantics as a Unix hard link. Any future modifications (e.g., the function setAttributes) to any link will also apply to all links. It fails if: source path does not exist, context does not exist, name already exists in context, the name contains the separator for this context, or if the source and destination paths are in different namespaces.

rebind(path, contextPath, name)

This function renames (moves) an existing name binding. This is essentially a link followed by an unbind of the source path. History is maintained across the rebind. It fails if: source path does not exist, context does not exist, name already exists in context, the name contains the separator for this context, or if the source and destination paths are in different namespaces.

setAttribute(path, key, value [,collectable])

This function sets or creates an attribute key/value pair for a binding. If the optional Boolean parameter collectable is true (default is false), the garbage collector will notify an application when such attributes are no longer accessible (see discussion below). It fails if the path does not exist.

setAttributes(path, pairs)

This function sets or creates multiple attribute key/value pairs for a binding. It fails if the path does not exist.

deleteAttribute(path, key)

This function deletes an attribute key/value pair from a binding if it exists. It fails if the path does not exist.

API Read Operations resolve(path [,timescape])=>Boolean

This function resolves a pathname and returns whether it exists in this timescape. The timescape parameter is optional, and if omitted, the path name will be resolved by searching all bindings that are active at the current time. That is, the resolve function defaults to the present timescape. If, on the other hand, a date/time value in the past is supplied for the timescape parameter, the path resolution will take place at the given date and time, and the function will return True only if the given path existed at that moment in the past.

list(path [,timescape] [,offset] [,limit])=> {names}

This function returns all the name bindings in a context. Syntactically, this means return all the simple names for which path is a prefix. If a timescape parameter is used, the names returned are the ones that existed at the given date and time. The optional parameters offset and limit are used to access a potentially large list of names in manageable "chunks." For example, if offset=1000 and limit=100, the procedure will return up to 100 names beginning with the 1000th. It fails if the path does not exist.

history(path [,timescape])=> {changes}

This function returns the modification history of the object named by path in this timescape. The history is always a complete one, so it will generally include modifications made before and after timescape, if any. The optional parameters offset and limit are as above. It fails if the path does not exist.

getAttribute(path, key [,timescape])=> value

This function returns the attribute value of the given key for the given path in this timescape.

getAttributes(path, [,prefix] [,timescape] [,offset] [,limit]) =>{pairs}

This function returns all attributes for the given path in this timescape. If a prefix string is supplied, only those attributes whose keys begin with the prefix are returned. The optional parameters offset and limit are as above.

getAttributeKeys(path [,timescape] [,offset] [,limit])=> {keys}

This function returns the keys of all the attributes for the given path in this timescape. The optional parameters offset and limit are as above.

getLinkCount(path, [,timescape])=>count

This function returns the number of links to the object named by path in this timescape. It fails if the path does not exist.

API Locking Operations lock(path, type, pid, timeout)

This function requires a namespace lock on the name specified bypath. The type and pid parameters can be any strings. They are intended to represent the lock type (e.g., "write") and the process identification of the acquirer. The namespace will automatically expire (release) the lock if it has not been explicitly released by timeout seconds. If the lock already exists and the pid is the same, the timeout value may be adjusted (a process can change the expiration time of its own locks if desired). It fails if the path does not exist or if there is an existing lock on path with the same type but with a different pid.

unlock(path, type, pid)

This function releases a namespace lock on the name specified by path. It fails if: the path does not exist, there is no existing lock with the given path and type, or if the lock belongs to a different pid.

API Garbage Collection garbage(namespace [,timescape] [,offset] [,limit]) =>{pairs}

This function returns a list of collectable attributes (see discussion in setAttribute above) key/value pairs that are no longer accessible via any name in the namespace, past, present or future. The optional parameters offset and limit are as above. It fails if namespace does not exist.

Namespace General Example

To further illustrate the intended semantics of the name binding methods above, here is a sequence of namespace calls along with the name graph transformations resulting from each.

Figure 8:
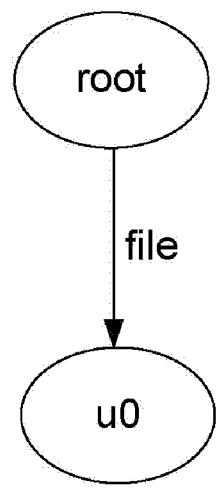
FIG. 8 shows creating a new namespace and its root node.

FIG. 8 shows creating a new namespace and its root node using the call: namespace("file").

Figure 9:
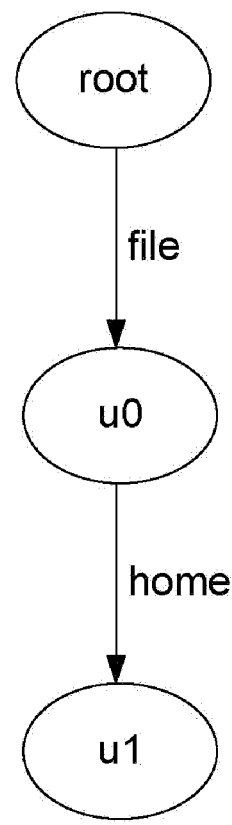
FIG. 9 shows creating a new node.

FIG. 9 shows creating a new node whose name is "home" in the root context using the call: bind("file", "home", "/", "left").

Figure 10:
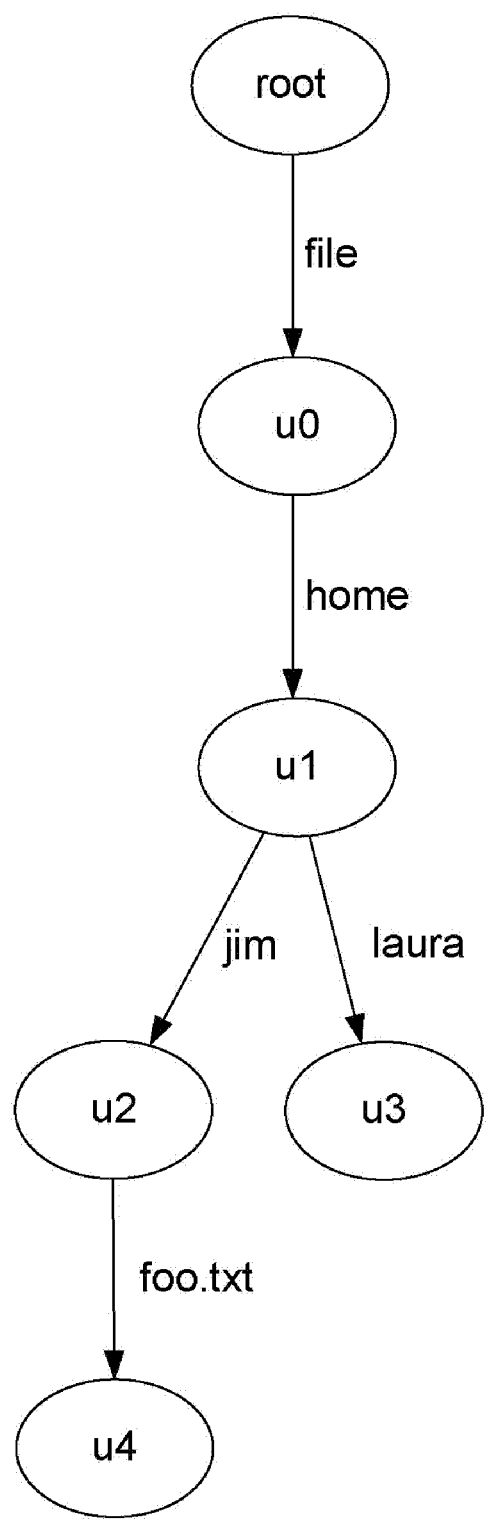
FIG. 10 shows creating three new nodes.

FIG. 10 shows creating three new nodes using the calls: bind(("file:home", "jim")), bind(("file:home", "laura")) and bind(("file:home/jim", "foo.txt")).

Figure 11:
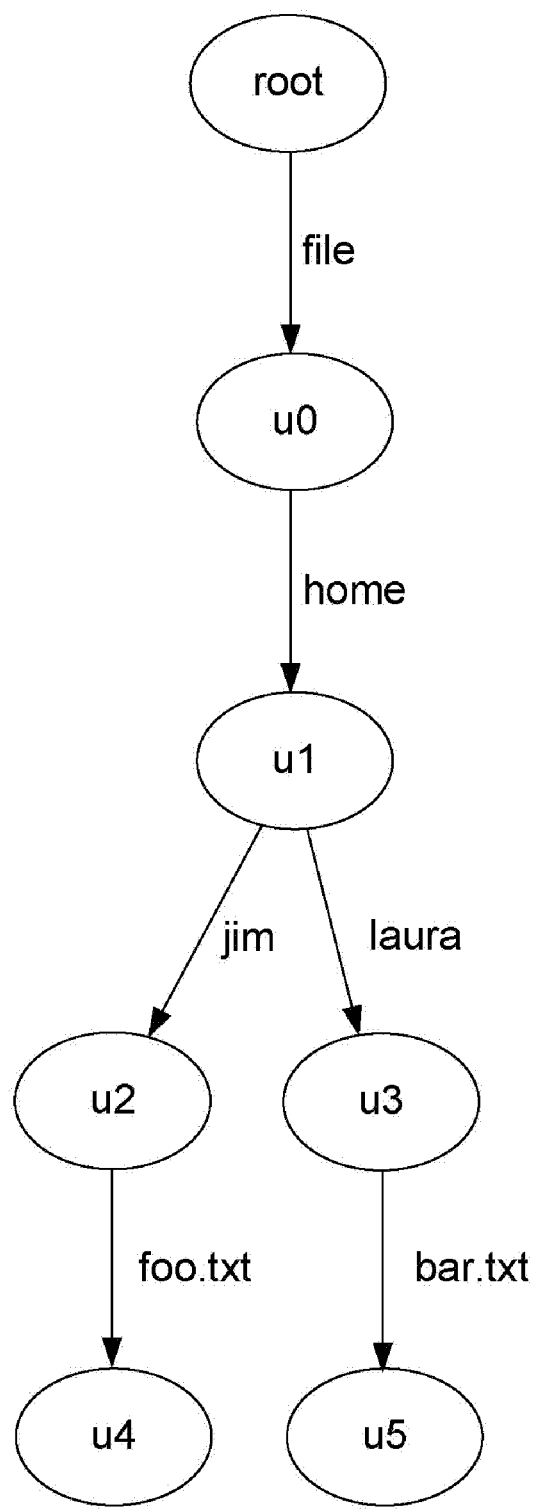
FIG. 11 shows making an alias for u5.

FIG. 11 shows making an alias for u5 using the call: alias (("file:home/jim", "foo.txt"), ("file:home/laura", "bar.txt")).

Figure 12:
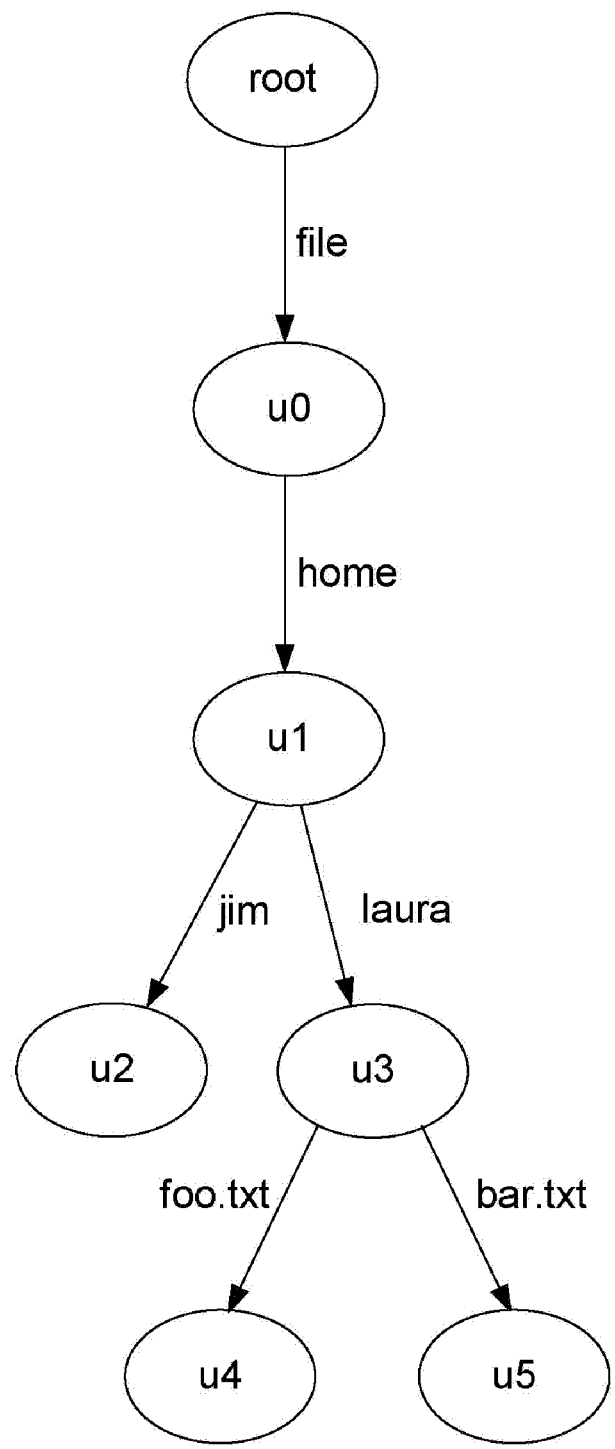
FIG. 12 shows renaming of an object.

FIG. 12 shows renaming (moving) "foo.txt" to Laura's context using the call: rebind("file:home/jim/foo.txt", "file:home/laura", "foo.txt")).

Figure 13:
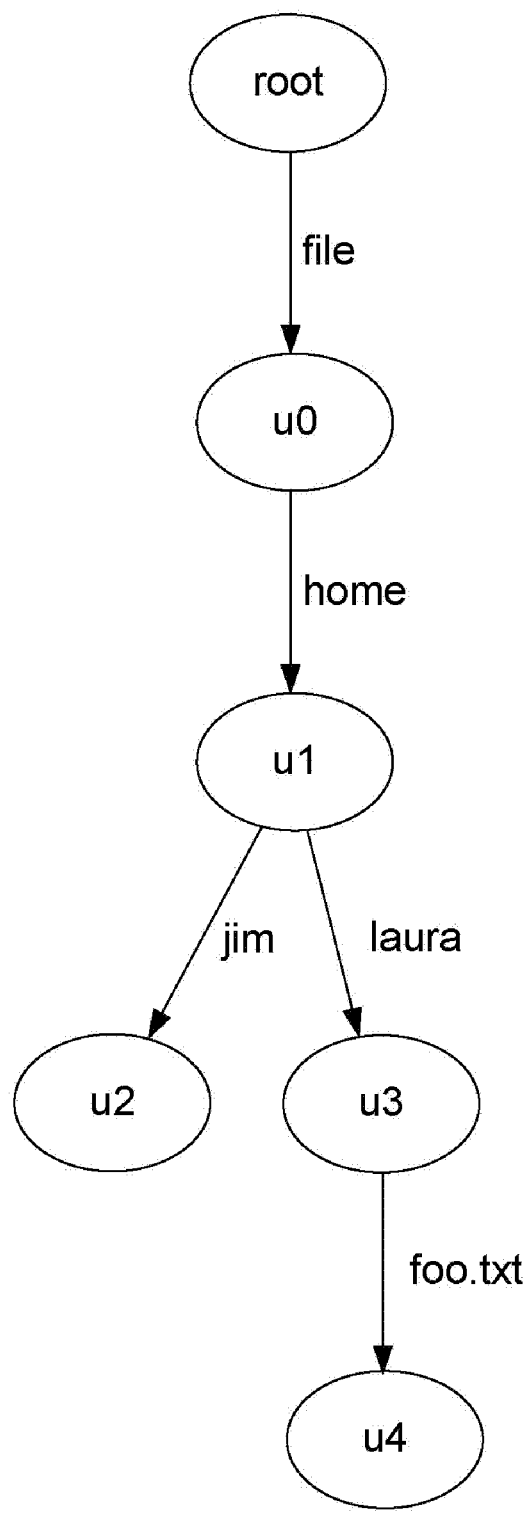
FIG. 13 shows deleting a name binding.

FIG. 13 shows deleting the "bar.txt" name binding using the call: unbind("file:home/laura/bar.txt").

Date Effectivity

All operations listed in the namespace Write Operations section above operate on the current state of the namespace (the "present timescape"), as do the default variants of the namespace Read Operations. As modifications are made to the namespace, the state of each name binding is saved, after being time stamped with the modification date and time (the "end date"). Read operations can also be given a timescape parameter, a date/time value in the past, to access information about name bindings as they once appeared. Each name binding has a start date, which is the date and time the binding first became effective, and possibly an end date, which is the date and time the binding was changed or deleted.

For example, suppose a new name binding for "green" is created in the context of object u1 at time t1. The name binding for this might look like:

(u1, "green", u2, start=t1)

Any namespace operation that changes a binding will create a new copy of it and fill in the end date for the copy, thus making a historical record of the old binding. Suppose, for example, the above binding is updated using bind("green", u3) at time t2. A new binding will be made and the original will be modified as indicated in the bind( ) operation. The result will be two bindings, one current and one historical.

(u1, "green", u2, start=t1, end=t2)
(u1, "green", u3, start=t2)

Now suppose the new binding is further modified using rebind("green", "blue") to change its name at time t3. A second historical binding will be created to record this event and the original will again be modified as the operation commands.

(u1, "green", u2, start=t1, end=t2)
(u1, "green", u3, start=t2, end=t3)
(u1, "blue", u3, start=t3)

It is preferred that the historical binding be a copy of the original, while the original is modified according to the namespace operations. This technique allows us to produce modification histories (see below) of a name binding.

Namespace read operations such as list( ) can obtain information about historical name bindings if the optional "datetime" parameter is included. For example, the call list ("home/jim", datetime=t) would return all the name bindings emanating from home/jim for which start>=t and end<t. Historical bindings that have been "end-dated" will be retained by the name space for some configurable period of time, and then they will be permanently deleted using garbage collection. In affect, it is possible to go back in time using this mechanism, but only up to a certain point.

Modification Histories

In addition to being able to see name bindings as they existed in the past, it may be necessary to view all the changes made to a name, for example, to recover a previous revision of a document that has been updated several times and moved from one subdirectory to another. The history( ) method allows this. When a new name binding is created with either create( ), alias( ), or link( ), a unique binding identity is assigned to it, which we refer to as the "binding unique identifier" or buid. Subsequent changes to the name binding using bind( ) (update), rebind( ) (rename), unbind( ) (delete), or setAttributes( ) will cause the binding to retain the original buid, while the new, end-dated, historical binding will also use the same buid. The history( )method simply returns all the bindings, past, current, or future, that have the same buid as the given name.

Namespace Locks

Strictly speaking, the namespace does not require a locking mechanism in order to ensure consistency of the name bindings, since all operations are atomic and stateless. The namespace, however, provides a general locking mechanism to support client applications, notably the CFS application, that do need to lock a name binding for certain purposes, for example, to implement write locks so that two processes cannot have the same file open for writing at the same time. The namespace itself doesn't assign any meaning to these locks, i.e., all namespace operations are always available to any client. Lock semantics and enforcement are strictly a matter of voluntary cooperation among client applications of the namespace.

Namespace Specific Example

Figures 14, 15, 16:
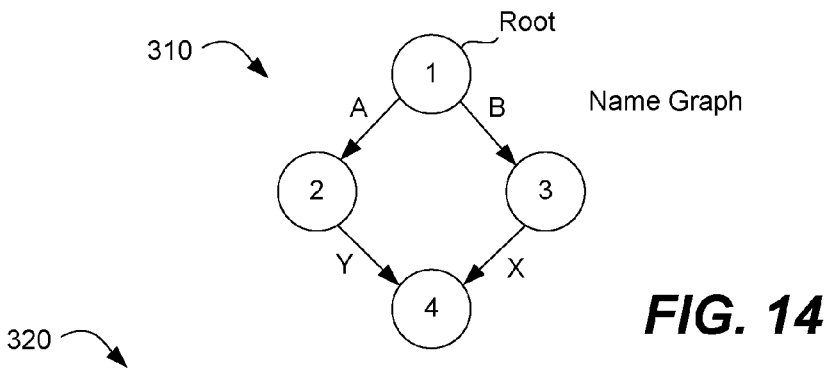
FIG. 14 shows a simple name graph including four objects.
FIG. 15 illustrates a bindings table present within the namespace.
FIG. 16 illustrates an attributes table also present within the namespace.

FIGS. 14-16 illustrate a simple, specific example of a name graph and its representation within a namespace. FIG. 14 shows a simple name graph 310 including four objects: a root 1, and objects 2, 3 and 4. Names A, B, X and Y link the objects and provide two paths to the object 4 (assuming that a separator of "/" is used): a path /B/X, and a path /A/Y. This simple name graph represents, for example, two different file names for the same computer file, namely /B/X and /A/Y. Assuming that object 4 includes an attribute which is the universally unique identifier for the computer file, the computer file may be retrieved from storage cluster 20 by traversing the name graph (in either direction), retrieving the UUID from object 4, and then passing the UUID to the storage cluster. Each object in the name graph is assigned a unique serial number, such as numbers 1-4. The serial numbers are assigned by the namespace and only used internally. While a namespace may include many different name graphs that are unconnected to one another except at the unique root, serial numbers are unique within the entire namespace.

FIG. 15 illustrates a bindings table 320 present within namespace 160. The bindings table is the means by which a name graph and its objects are represented and traversed; bindings table 320 implements name graph 310 by listing a binding in each row. Column 322 includes the serial number of the object and provides the context for that binding. Column 324 is the name assigned to the binding. Column 326 is the serial number of the object to which the name is being applied. Column 328 is the start date and time at which the binding was first created. Column 330 is the end date and time at which the binding was deleted. Start and end times are calculated and stored down to the nearest second. Of course, depending upon the CPU and operating system involved, it is possible to calculate and store a time in a much finer granularity, such as tenths or hundredths of a second, if desired. In this fashion, a continuous record of the state of a namespace, its objects, and ultimately, the digital objects represented by the namespace may be maintained and referred to for purposes of providing automatic continuous backup capabilities.

Column 332 refers to the path traversal direction used by the name in the context of the entire pathname. For example, file system path names generally are consistent in that as the name is traversed from left to right the location of the computer file becomes more specific (e.g., "home" followed by "documents" followed by "brochure.pdf"). Other path name schemes become more specific as the name is traversed from right to left, e.g., johndoe@companyX.com. And some path names, such as URLs, combine a bit of both. Therefore, the "direction" field of each binding row in the bindings table allows the namespace to specify in which direction is the "name" becoming more specific. For example, typical file names represented in the namespace would all have a direction of "left" because they become more specific when traversed from left to right. Conversely, e-mail addresses will have a direction of "right." Path names such as URLs referring to digital objects may have a combination of bindings of both "left" and "right."

Column 334 indicates the separator used between names in a particular path name scheme. For example, Apple file names typically use a "/" as a separator between names in a path name for a computer file. Other commonly used separators are: "\" used in Windows file systems, ":" used in some Apple Macintosh file systems, "." used in IP addresses and to delineate top-level domain names, "@" used in email addresses, "-" used to separate the parts of telephone numbers, and others. The separator in a binding row refers to the separator used immediately preceding or immediately following the name in the path name of the digital object, depending on the direction of the separator.

There is no further pertinent information in the bindings table.

The first row of bindings table 320 indicates that the bind function has been used to bind object 1 to object 2 using a name of "A." The binding was created on a particular date at 8:34 a.m. and 16 seconds. Although dates are not shown in this column for ease of explanation, typically column 328 includes the date and the time down to the nearest second. If object 2 does not exist when the bind function is called then the object is created at that time. The second and third rows illustrate the results of similar calls to bind. The fourth row shows the result of a link function call that links object 2 to the pre-existing object 4. The values for the "end date" column are set to a distant time in the future (such as year 4,000) to indicate that the binding is still in existence. Thus, it can be seen that rows in the bindings table are built up for a particular namespace as objects and links are added to the namespace. As explained below, a client application may then use an existing name graph, by referencing its bindings in the bindings table, to retrieve a digital object from storage cluster 20 using any of a wide variety of different path name schemes.

FIG. 16 illustrates an attributes table 360 also present within namespace 160. As the bindings table is simply row after row of bindings that represent a name graph, the attributes table is simply row after row of attributes. Each row identifies a particular attribute for a particular object in the name graph and provides a value. For example, the first row indicates that object 4 includes a UUID and that the value for this identifier is "F84B91CD," which is a hexadecimal number representing the random number that identifies the digital object uniquely within storage cluster 20. Of course, a unique identifier for an object that identifies a digital object in the storage cluster may have any value that is suitable for the implementation of the storage cluster. For example, the unique identifier may be a randomly generated number for the digital object, may be a hash value resulting from a hash function applied to the contents of the digital object, or may be some other unique identifier assigned by a central authority. Examples of the latter include international telephone numbers, IP addresses using IPv4 or IPv6, fully qualified domain addresses, latitude/longitude locations, coordinates in Cartesian and other coordinate systems, and many others.

In the present implementation, the attribute named UUID is a universally unique identifier used by the CAStor software and its value is a randomly generated number having 128 bits. The second row indicates that object 4 has an attribute called "mode" and its value is the one stored in row 366 of the table.

Other attributes such as "user identifier" and "group identifier" can be used to store arbitrary metadata about the digital object.

As with the bindings table, the attributes table provides a start date and an end date for each attribute of each object. These dates allow for timescape functionality identical to that described for bindings above. In particular, the namespace can provide a full set of attributes and their values for any digital object as some arbitrary date in the past. Attributes of objects are determined by the client application and any attributes and values may be stored depending upon the needs of the client application. For example, attributes may represent metadata associated with digital objects in storage cluster 20. As shown in FIG. 16, a useful attribute is the universally unique identifier that allows a client application to retrieve the digital object from the storage cluster.

Syntactic Generality of the Namespace

One embodiment of the present invention stores a digital object in the storage cluster and creates a representation in the namespace that takes into account the preferred pathname scheme used by the client application. As discussed above, client applications use a variety of path name schemes for referring to digital objects. URLs are typically in the form of: "www.company.com/folder/blue" (general to specific flows in different directions within this path). URIs are of the form: "ftp://" or "file://home/Fred/file.txt". IP addresses have the form: "192.168.1.1". Apple computers have file names of the form: "home:green:blue," while computers running the Microsoft operating system have file names of the form: "\home\green\blue." Thus, path name schemes are different in that they use different syntax, but are similar in that they use certain delimiters to separate names within the path name, and, consistently progress from the general to the specific, from the specific to the general, or use a predictable mixture of both. Therefore, the present invention represents these names, delimiters and direction of specificity in a namespace to allow syntactic generality. In other words, any client application, no matter which pathname scheme it uses, will be allowed to store, manage and retrieve the same digital object to which another client application refers to using an entirely different pathname scheme.

Figure 17:
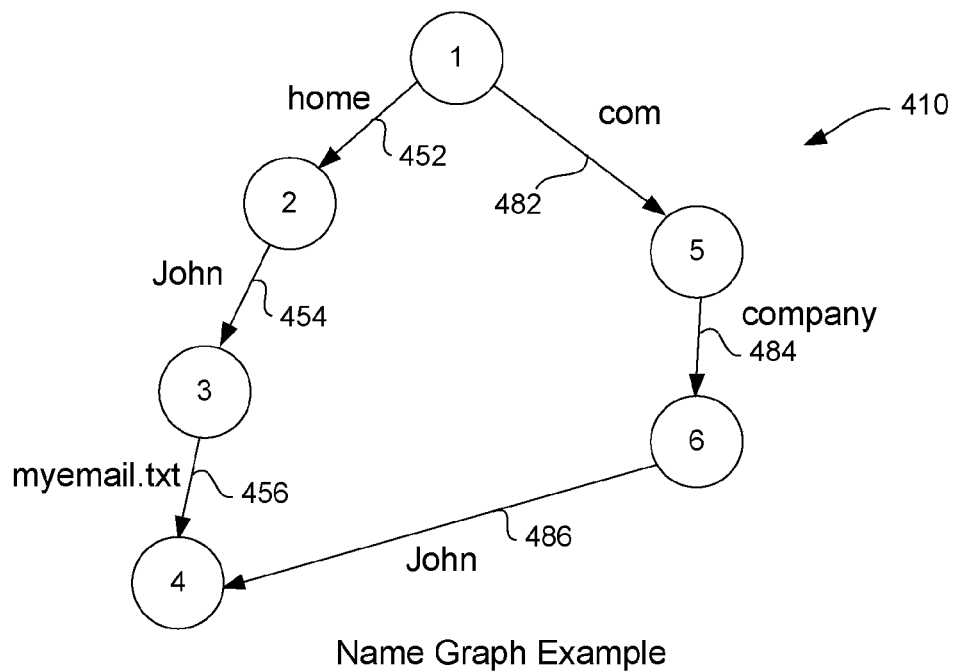
FIG. 17 is an example name graph used in the explanation of the following flow diagrams.

FIG. 17 is an example name graph 410 used in the explanation of the following flow diagrams. As shown, the graph includes a first path via objects 1, 2, 3 and 4, and a second path via objects 1, 5, 6 and 4. Both paths end at object 4, which preferably includes an attribute holding the universally unique identifier for a particular digital object in the storage cluster 20. In this example, the digital object is a file "myemail.txt" holding configuration information for the individual John. The first path represents, for example, a Unix pathname for a particular file, while the second path represents a typical e-mail address pathname. One or more client applications may wish to store or access the file using a different pathname.

Figure 18:
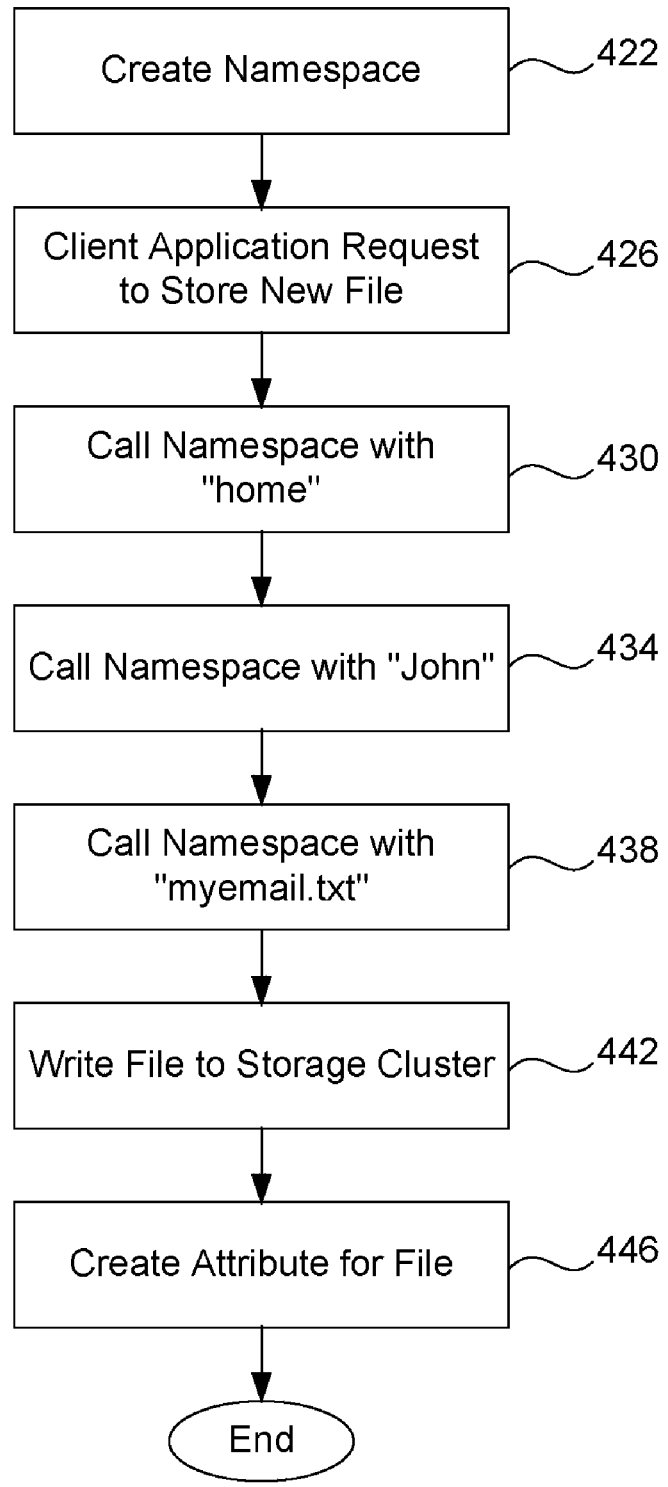
FIG. 18 is a flow diagram describing creation of a portion of the name graph using this example.

FIG. 18 is a flow diagram describing creation of a portion of the name graph using this example. In step 422 any suitable client application (such as client application 110) uses the Content File Server application 120 in order to create a namespace on namespace server 60. Of course, the client application may access the namespace server directly instead of using CFS. A root object 1 is created; at this time, both the bindings table and the attributes table are blank. The create namespace command may also be initiated by the installer when the namespace module is installed on the namespace server. In step 426 the client application requests of CFS to store a new file in the storage cluster and store its representation in the namespace. In this example, the pathname to the file is "home/John/myemail.txt." Preferably, the client application parses the entire pathname in order to provide to CFS each portion of the pathname (in increasing specificity), the delimiter preceding each name, and the actual contents of the computer file to be stored.

In step 430 the CFS (or the client application if accessing the namespace directly) calls the namespace with the bind function and the first name "home," and the appropriate delimiter and direction, in order to create binding 452. New object 2 is also created at this time. In response, the namespace creates a row in the bindings table in order to represent this new binding. Similarly, steps 434 and 438 call the bind function with the names "John" and "myemail.txt" in order to create objects 3 and 4, and the bindings 454 and 456, respectively. At this point, a name graph has been created with objects 1, 2, 3 and 4, with object 4 uniquely representing the digital object "myemail.txt." Next, step 442 writes this file to the storage cluster and the storage cluster returns a unique identifier or a universally unique identifier. Finally, in step 446 the CFS creates an attribute "UUID" (for example) and sets this attribute equal to the returned unique identifier for object 4 in namespace 410. As mentioned above, the client application may create any suitable attribute for any object, although none are required. Consequently, the namespace now provides a path using a particular pathname scheme to object 4 that holds the unique identifier for the computer file stored in storage cluster 20.

Figure 19:
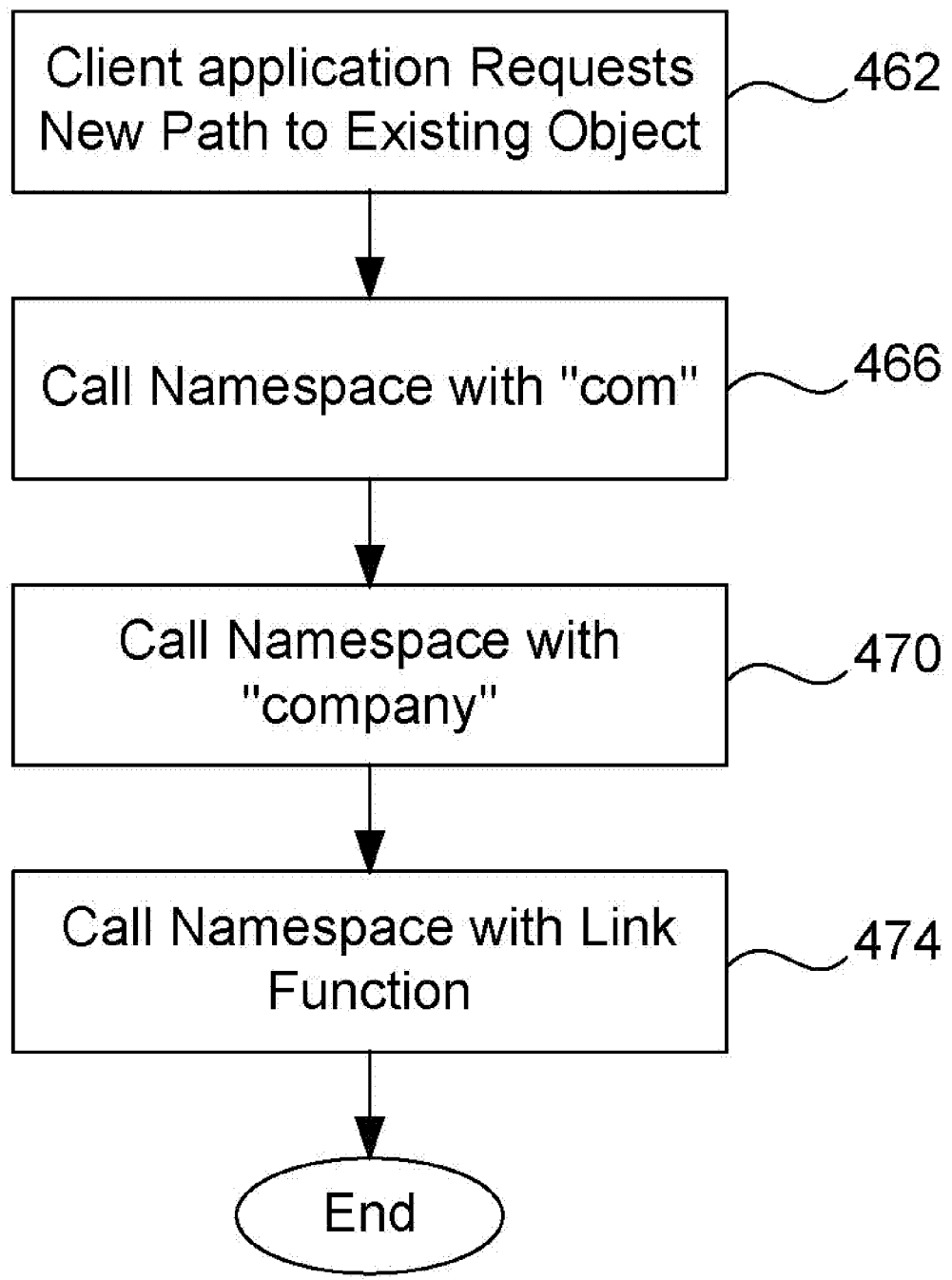
FIG. 19 is a flow diagram describing creating another path to the same object using a different pathname scheme.

FIG. 19 is a flow diagram describing creating another path to the same object 4 using a different pathname scheme. In this example, a different client application (such as client 130), using a different pathname scheme, desires access to the same computer file "/home/John/myemail.txt" that had previously been stored in the cluster and represented in the namespace.

In step 462 the client application 130 requests that the namespace create a new path using the pathname "John@company.com," which is then linked to an existing object in step 474. The namespace link function links the newly formed pathname, "John@ company.com" to the exact same object that is currently named by the path "/home/John/myemail.txt," which in this example is object 4. A namespace link is similar in construction and use to a "hard link" in Unix-like file systems.

Preferably, the client application parses the entire pathname in order to provide to the namespace each portion of the pathname (in increasing specificity) and the delimiter preceding each name. In this example, the client application parses the pathname to obtain the names in increasing specificity as follows: "com," "company," and "John."

In step 466 the client application calls the namespace with the bind function and the first name "com," and the appropriate delimiter and direction, in order to create binding 482. New object 5 is also created at this time. In response, the namespace creates a row in the bindings table in order to represent this new binding. Similarly, step 470 calls the bind function with the name "company" in order to create object 6 and the binding 484. Next, the client application calls the link function passing as arguments the existing path to object 4, the current path to object 6, and the name "John" in order to create binding 486. At this point, a new path has been created with objects 1, 5, 6 and 4; object 4 still uniquely represents the digital object "myemail.txt" by virtue of this object holding the attribute UUID and its value. Therefore, two different client applications now each have a different path using a different pathname scheme to the same object within the namespace. This object 4 holds the attribute UUID that provides a unique identifier for the digital object within the storage cluster.

Of course, once a namespace has been built as discussed above (and one or more pathnames lead to a particular object holding the unique identifier for a particular file in the storage cluster), it is possible for any client application to retrieve that unique identifier using any of the various pathnames. Once the unique identifier is retrieved from the namespace, it may be used to access a particular digital object in the storage cluster. For example, a Unix client application that wishes to retrieve the computer file "myemail.txt" may do so by calling a namespace function as follows:

GetAttr(UUID, /home/John/myemail.txt).

This "get attribute" function will return the universally unique identifier based upon the Unix style pathname provided. The UUID may then be used to retrieve the computer file from the storage cluster. To execute this function call, the namespace receives the Unix pathname and walks down the left-hand side of name graph 410 (using the information in the bindings table) until it reaches object 4. Then, it accesses the attributes table for object 4 to retrieve the value for attribute name "UUID."

Now consider an e-mail program client application that wishes to retrieve the same computer file but using its own different pathname. It would call the namespace function as follows:

GetAttr(UUID, John@company.com).

Note that the e-mail program is allowed to use its own pathname scheme but the end result is that it will retrieve the same universally unique identifier and will then be able to retrieve the same exact computer file from the storage cluster. To execute this function call, the namespace receives the e-mail pathname and walks down the right-hand side of name graph 410 (using the information in the bindings table) until it reaches object 4. Then, it accesses the attributes table for object 4 to retrieve the value for attribute name "UUID."

Figure 20:
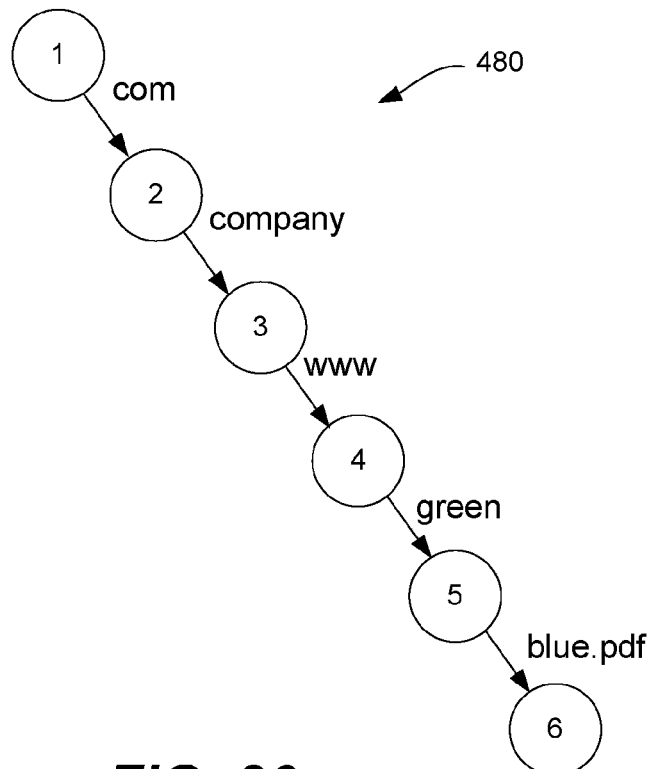
FIG. 20 illustrates another example of a name graph representing a URL-type pathname.

FIG. 20 illustrates another example of a name graph representing a URL-type pathname. Consider the following URL that identifies a particular file stored in a particular location: http://www.company.com/green/blue.pdf. This particular pathname scheme does not consistently flow from the general to the specific either from left-to-right or from right-to-left; rather, the flow changes direction within the pathname. A client application wishing to store the digital object "blue.pdf" would parse the above URL and make progressive calls to the namespace function bind passing more specific names from the URL with each call. Accordingly, FIG. 20 illustrates symbolically the generated name graph of the namespace progressing from the broadest name, "com," down to the most specific, "blue.pdf." The bind function makes use of the parameters separator and direction to store this information in the bindings table. This information is then used from the bindings table when any client application wishes to retrieve the digital object "blue.pdf." As discussed above, a client application simply passes the URL "http://www.company.com/green/blue.pdf" to the namespace which then uses the bindings table and the direction and separator information in order to traverse this name graph, arrive at object 6 and retrieve the UUID corresponding to the file "blue.pdf."

Thus, the namespace is able to take an entire pathname of whatever kind used by the client application and, as long as a path according to that pathname scheme has previously been represented in the namespace, the namespace will return any desired attribute associated with any particular object. In this example, client applications are able to use their own pathname scheme in order to refer to the same digital object stored in a storage cluster.

Namespace Shared Between Applications

As mentioned above, any client application, such as clients 110-130, may access the namespace using its own particular pathname scheme, yet be assured each path refers to the same digital object. In the example of FIG. 17, two different pathnames from two different client applications both lead to object 4 which holds, for example, an attribute of UUID which has a universally unique identifier value that identifies a single digital object within storage cluster 20. As attributes table 360 holds all attributes for all objects, and is accessible to any client application wishing to read or set an attribute of a particular object, the namespace and its objects and attributes are essentially shared between all client applications. A client application changing a particular attribute for a particular object will have this change also viewable by any other client application. In the example used herein, where an object represents a digital object in the storage cluster (e.g., object 4 of FIG. 17 holds the UUID for the file "myemail.txt" stored in the storage cluster), this means that digital objects and changes to digital objects (and their metadata) are also shared between all client applications.

For example, if one client application wishes to modify a computer file stored in the storage cluster and have all other client applications reference the modified file, it may do so. The client application first modifies the computer file, stores it in the storage cluster, receives a new UUID, and then executes the following namespace function: SetAttr(UUID, <path>, new UUID). The result is that this set attribute function will find the particular object specified by "path" (e.g., object 4 via the left-hand pathname), and change the attribute UUID to be the new UUID value. Thus, any other client application referencing object 4 (e.g., a client application using the right-hand pathname) will retrieve the new UUID value when accessing the UUID attribute and will be able to retrieve the modified computer file in the storage cluster.

Of course, any attribute changed for a particular object will be seen by any of the client applications accessing that object. A client application may change the metadata for a particular digital object stored in the storage cluster by changing a particular attribute for object 4, for example. Examples of metadata that a client application may change include: modification date, permissions, access control lists, object size, keywords, and so on.

Continuous Backup Feature of Namespace

As mentioned above, implementation of the namespace of the present invention results in virtually a continuous backup of digital objects stored within a storage cluster and continuous backup of any of their associated attributes stored in the attributes table of the namespace. Of course, the storage cluster must ensure that all versions of digital objects are retained for a period of time over which a continuous backup is desired and the namespace must ensure that attributes and their values are retained during that period of time as well. The namespace is able to implement the continuous backup feature using a combination of particular function calls and use of the start date and end date field of the bindings and attributes tables.

Figure 21:
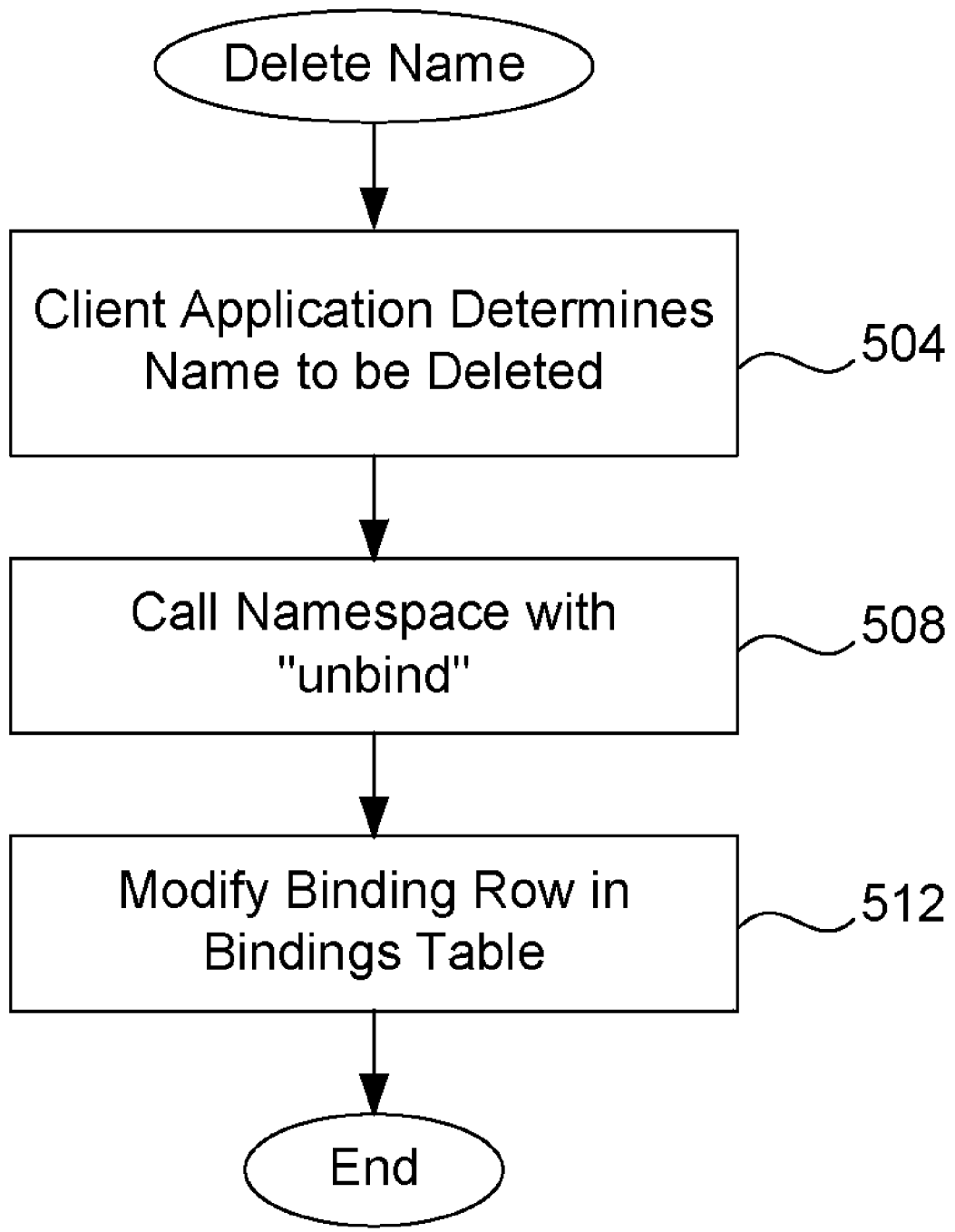
FIG. 21 is a flow diagram describing how a digital object for a particular client application may be deleted.

FIG. 21 is a flow diagram describing how a digital object for a particular client application may be deleted. Considering the name graph example of FIG. 17, assume that the individual "John" has left the company and it is desired to delete his data, including his e-mail configuration file "myemail.txt" that exists within the storage cluster. In step 504 the appropriate client application (such as an e-mail program in the company) determines that the pathname to reference that particular file is "John@company.com" (previously stored using the example of FIG. 19). The client application then determines that the name "John" should be unbound from whatever object it currently points to. It would not be appropriate to actually remove the object 4 from the namespace because it is possible that another client application is using a different pathname to reference that object (which is true in this example). And, even if no other client application refers to this object, removal of object 4 would result in information being lost indicating that the configuration file "myemail.txt" actually existed at a particular time in the past.

Next, in step 508 the client application calls the namespace with the unbind function passing in the context, object 6, and the name of the binding to be removed "John." In order to indicate that the file has been "deleted" (at least as far as the e-mail program is concerned), in step 512 the namespace simply modifies a row in the bindings table to provide an "end date" for the binding "John." For example, before deletion, the row in the bindings table might have appeared thus: "6 John 4 1/1/2009:08:36:00 4,000." This row indicates that the binding 486 was created on Jan. 1, 2009 and, at the time of creation, it had an end date of more or less infinity (the direction and separator fields have been left off for clarity). Assuming that the client application deletes the configuration file at 10 a.m. on that date, the bindings row would appear as follows after deletion: "6 John 4 1/1/2009:08:36:00 1/1/2009:10:00:00." Note that all that has happened is that an end date of 10 a.m. has been provided for this binding. The binding has not actually been removed from the namespace; object 4, and the configuration file, continue to exist in the namespace and in the storage cluster, respectively. Therefore, any client application having a path to object 4 (and thus to the configuration file) will continue to do so. The e-mail program previously using the pathname "John@company.com" will not be able to access the configuration file because the binding 486 has been effectively removed by providing an end date in the bindings table.

When accessing objects and bindings in the namespace the namespace will assume a time of the current time and will not recognize any binding for which the current time does not fall within the start date and the end date. For example, should the e-mail program attempt to access the configuration file at 11 a.m. on Jan. 1, 2009, such an access will fail because 11 a.m. is after the end date time for that binding of 10 a.m. By contrast, the e-mail program may access the configuration file as it existed in the past as long as it provides a past time parameter falling between the start date and the end date for binding 486. The namespace simply compares the input time parameter to the start date and end date. By default, the namespace assumes the time parameter is the current time. Of course, should the e-mail program attempt to access the configuration file in the past by providing a time before Jan. 1, 2009 at 8:36 a.m., such an access will also fail because the namespace will determine that the provided time in the past is before the start date time for that particular binding.

Note that during the process of FIG. 21 the attributes for object 4 stored in the attributes table do not change because it is only the binding 486 that is being provided with an end date in the bindings table; none of the attributes for object 4 are being changed or deleted. Attributes are not changed or deleted during this process because another client application may be using the object and because the attributes and their values should be retained for historical access to the configuration file as it existed in the past.

Figure 22:
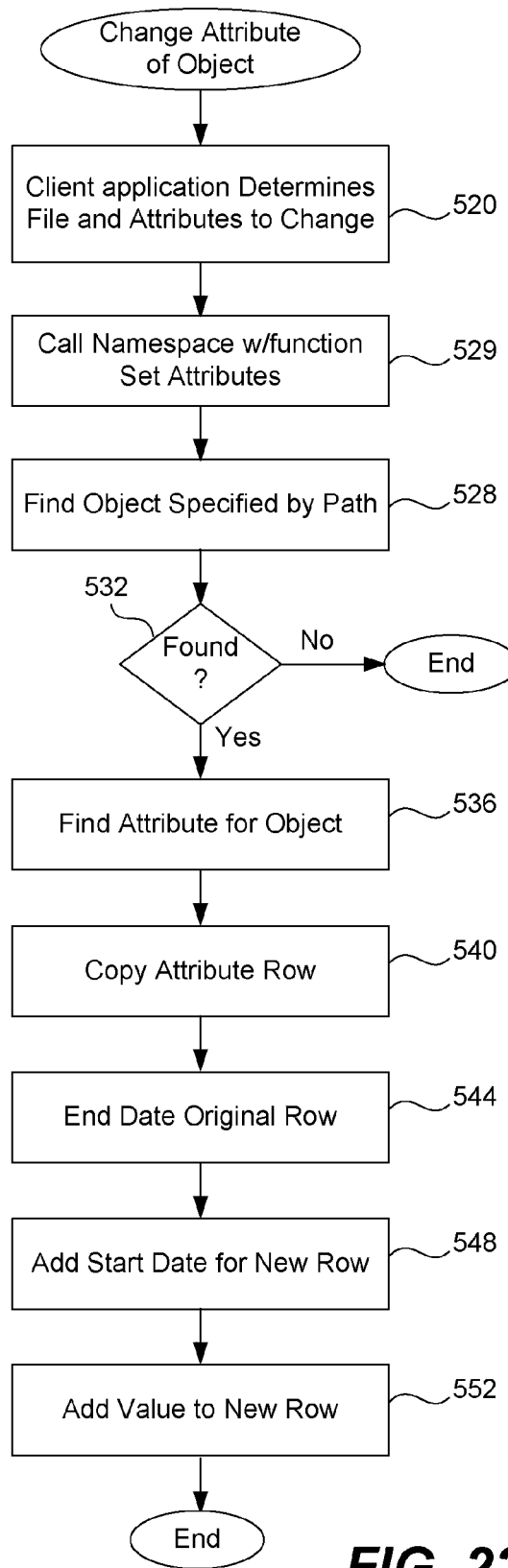
FIG. 22 is a flow diagram describing how an attribute of an object in the namespace may be changed.

FIG. 22 is a flow diagram describing how an attribute of an object in the namespace may be changed. In this example, even though an attribute may be changed, the historic value of that attribute is retained. For example, if a computer file is modified in the storage cluster by a client application, it will be desirable for the original version of that computer file to not only be retained by the storage cluster, but also be accessible for any client application that wishes to view that file as it existed in the past. Accordingly, allowing an old value for a UUID attribute to be retained by the namespace (in the attribute table) is desirable.

In step 520 a client application determines a particular computer file and an attribute of that file that it wishes to change. Preferably, the client application determines the pathname referencing that file in the namespace (previously set up) and the attribute that it wishes to change. In one example, the client simply wishes to modify a metadata attribute for a particular computer file without changing the file itself. Or, the client has modified the computer file and received a new UUID from the storage cluster referencing the new version of the file. Accordingly, this new UUID must be used to replace the old UUID attribute in the object in the namespace that represents the computer file.

In step 524 the client application calls the namespace with the set attribute function passing in the name of the attribute to be changed (such as UUID), the pathname to the desired object in the namespace, and the new value of the attribute to be changed. In step 528 the namespace attempts to find the object in the namespace using the provided pathname. It is possible that the object does not exist (never did exist or has been deleted). If not, in step 532 the process ends. If the object is found, in step 536 the attributes table is searched for a row corresponding to that particular object and the attribute name that has been passed in the set attribute function call. If the current time does not fall within the range of the start date and the end date for that particular attribute (the attribute is not "live") then the process ends because the attribute for that object has previously been deleted and cannot be changed.

Once found, the "live" attribute row is copied in step 540 to produce an identical new row for that same object and attribute in the attributes table. In step 544 an end date for the original row is supplied (using the current time) indicating that the old value for the attribute has existed up until the current time when it has been changed. In step 548 the start date for the new row with the new value for the attribute is set to the current time, and the end date is set to an infinity value. Next, in step 552 the new value for the attribute is inserted into the value field for the new row. Accordingly, the old value for the attribute is retained in the attributes table and its time of existence is accurately reflected using the start date and end date in that original row. The new attribute value is reflected in its own row in the attributes table with a start date indicating when it came into existence. In this fashion, a client application may modify a file in the storage cluster and change the UUID attribute for the corresponding object in the namespace, thus indicating that the new file has come into existence at a particular time, yet still retaining the old value of the UUID should a client application desire to view the original version of the file at a time prior to its being changed. In other words, old versions of attributes are not deleted, but are retained with appropriate start and end dates.

Figure 23:
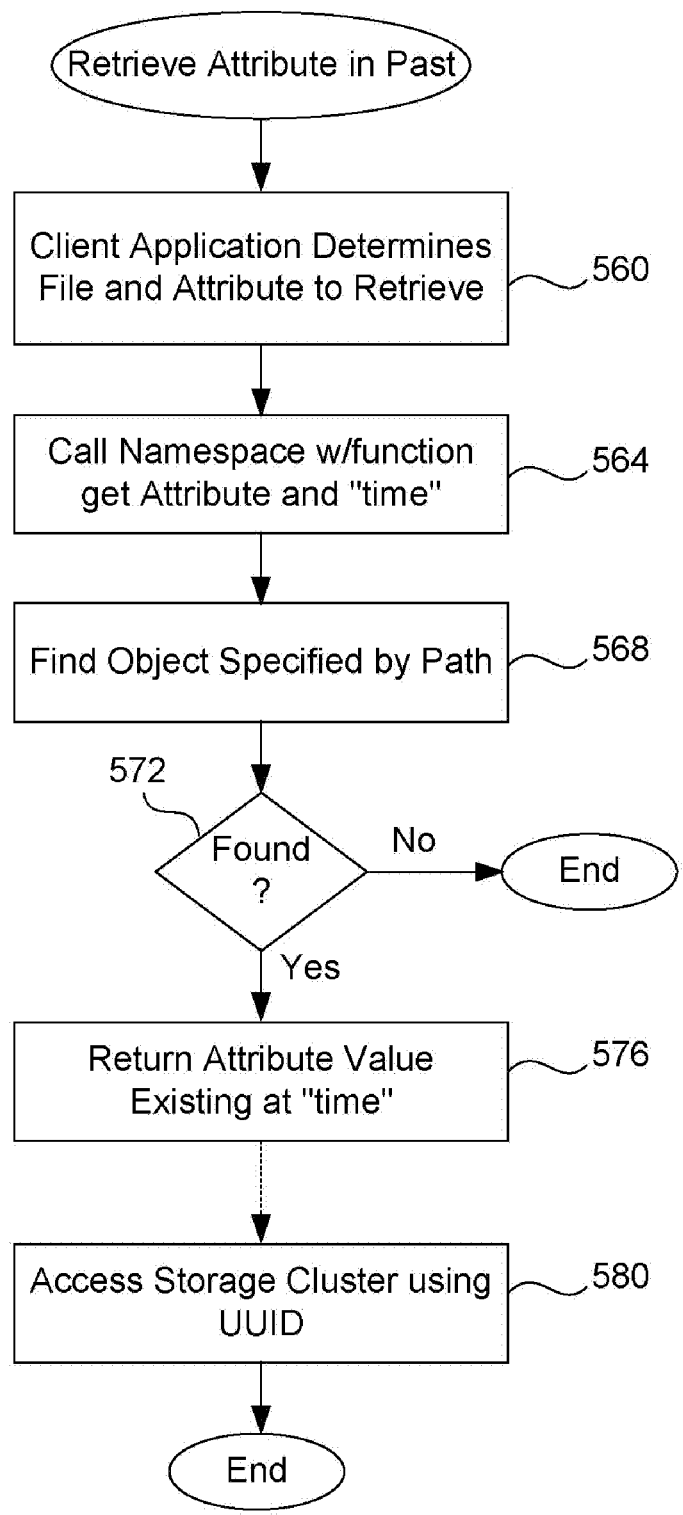
FIG. 23 is a flow diagram describing how an attribute of an object in the namespace may be retrieved

FIG. 23 is a flow diagram describing how an attribute of an object in the namespace may be retrieved. In this example, even though an attribute may have changed, its historic value may be retrieved. For example, if a computer file is modified in the storage cluster by a client application, it possible for the original version of that computer file to be retrieved by any client application that wishes to view that file as it existed in the past.

In step 560 a client application determines a particular computer file and an attribute of that file that it wishes to retrieve. Preferably, the client application determines the pathname referencing that file in the namespace (previously set up) and the attribute it desires. In one example, the client simply wishes to retrieve a metadata attribute for a particular computer file without retrieving the file itself. Or, the client wishes to retrieve a version of the file as it existed at a particular point in the past and will need to retrieve the UUID attribute of that old version in order to retrieve the version from the storage cluster.

In step 564 the client application calls the namespace with the get attribute function passing in the name of the attribute to be retrieved (such as UUID), the pathname to the desired object in the namespace, and the time for when that attribute is believed to have existed. The time may be supplied down to the second, which provides virtually a continuous ability to retrieve files and attributes as they existed in the past.

In step 568 the namespace attempts to find the object in the namespace using the provided pathname. It is possible that the object never did exist in which case the desired path would not exist. If so, in step 572 process ends. The namespace traverses the name graph looking for each portion of the pathname in turn (using the bindings table) and ensuring that the time provided is between the start date and end date for each binding it is traversing. In the example of FIG. 17, the namespace would only reach object 4 if it is determined that bindings 482-486 were in existence during the time value provided. If so, the process moves to step 576 having found object 4, for example.

The attributes table is searched for a row corresponding to that particular object and the attribute name that has been passed in the get attribute function call. If the provided time value does not fall within the range of the start date and the end date for that particular attribute, this indicates that the desired attribute did not exist at that point in time in the past and the process ends. If the attribute did exist at that point in time, then its corresponding attribute value is returned to the client application in step 576. Optionally, if the attribute desired is a UUID for a digital object that existed at a particular time, then in step 580 the client application uses this identifier to access the storage cluster and retrieve the digital object as it is existed at that point in time.

In this fashion, a client application may retrieve a file in the storage cluster as it existed at any time in the past down to the nearest second. This embodiment thus provides near continuous backup capability without the need for the storage cluster or client application to provide discrete backups or discrete snapshots of the system at a particular time.

Garbage Collection

When unbind( ) is called on a name binding, we cannot immediately forget the ObjectID to which it refers because there may still be other names (aliases and links) to the same object. Even if there are no other names, we still cannot forget the ObjectID because the date effectivity mechanism will, in general, still allow historical access to the object through name bindings that are no longer current. Since the namespace does not assign any semantics to an ObjectID, there are really no resources associated with an object that needs to be released, except the name bindings that refer to it of course. Client applications, like the CFS application, will want to know when an object can no longer be accessed through the namespace in any way whatsoever, since knowing that would allow the clients to, for example, delete the object from the fixed-content storage cluster 20. This is generally called "garbage collection" and there are several standard algorithms for dealing with it. Of course, the namespace does not really collect anything, it merely identifies a set of ObjectIDs that can no longer be named in any way. The garbage( ) method returns such a list and allows client applications to deal with the ObjectIDs in whatever way they wish.

Implementation on a RAIN

The representation of the namespace also present advantages. As described and shown herein, a name graph of the namespace can be broken down into many different bindings i.e., tuples. This representation allows the namespace to be stored within a RAIN by replicating and spreading the bindings across different nodes of the RAIN. The bindings are simply broken apart, replicated and stored on different nodes. Symmetric, distributed algorithms put the pieces back together in order to resolve a pathname to a given object. In another embodiment, the namespace is implemented on a RAIN cluster, thus providing for the distribution of bindings across the cluster.

Computer System Embodiment

Figure 24A:
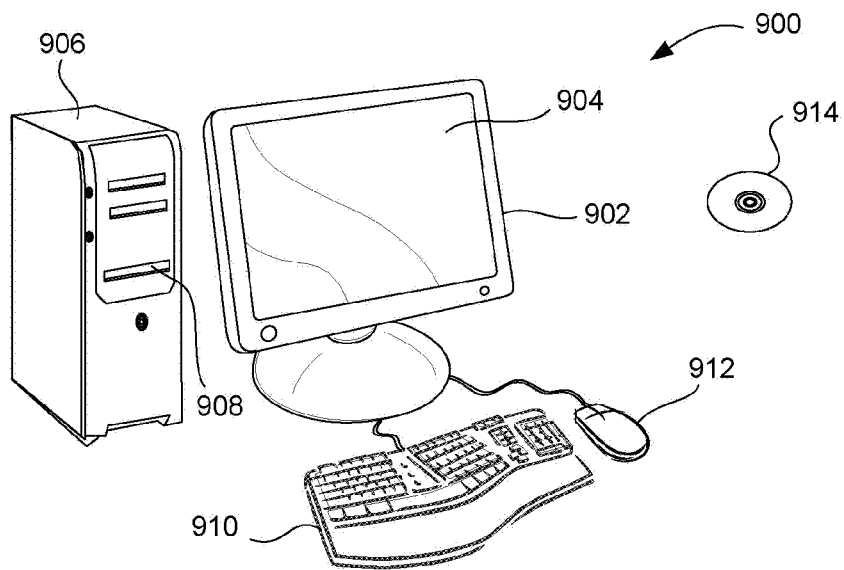
FIGS. 24A and 24B illustrate a computer system suitable for implementing embodiments of the present invention.
Figure 24B:
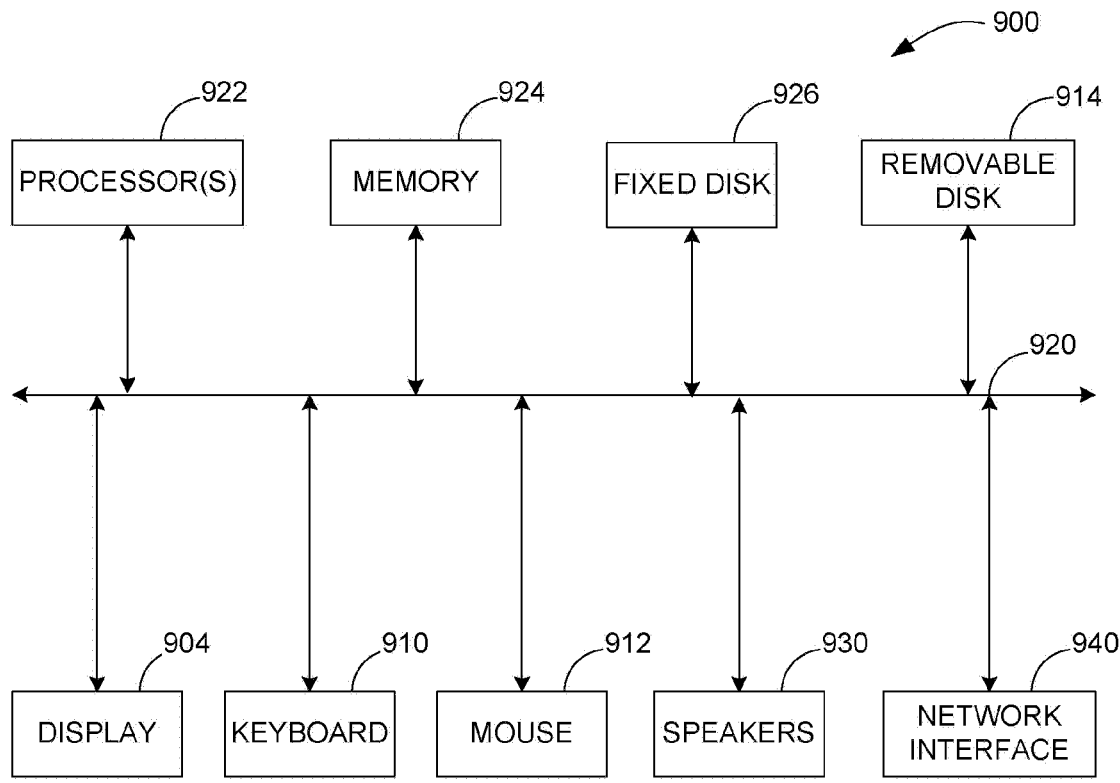

FIGS. 24A and 24B illustrate a computer system 900 suitable for implementing embodiments of the present invention. FIG. 24A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 24B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of adding a computer file to a storage cluster, said method comprising:

receiving a first pathname identifying a computer file that uses a first pathname scheme of a client software application;

parsing said first pathname by said client application into its constituent name portions;

constructing a representation in a database of said first pathname identifying said computer file using said name portions, said representation forming a path arranged to be traversed progressively from the most general name portion to the most specific name portion;

passing said computer file to said storage cluster and receiving a unique identifier from said storage cluster that uniquely identifies said computer file stored within said storage cluster;

storing said unique identifier in conjunction with an end of said representation of said first pathname in said database, whereby said computer file is uniquely represented in said database by said representation; and forming a second path in said database using name portions from a second pathname that is different from said first pathname, said second path terminating at said end of said representation of said first pathname, whereby a traversal of said path and a traversal of said second path both terminate at said end where said unique identifier is stored.

2. A method of adding a computer file to a storage cluster, said method comprising:

receiving a first pathname identifying a computer file that uses a first pathname scheme of a client software application;

parsing said first pathname by said client application into its constituent name portions;

constructing a representation in a database of said first pathname identifying said computer file using said name portions, said representation forming a path arranged to be traversed progressively from the most general name portion to the most specific name portion;

passing said computer file to said storage cluster and receiving a unique identifier from said storage cluster that uniquely identifies said computer file stored within said storage cluster;

storing said unique identifier in conjunction with an end of said representation of said first pathname in said database, whereby said computer file is uniquely represented in said database by said representation;

receiving a second pathname that uses a second pathname scheme that is different from said first pathname scheme; and storing name portions of said second pathname in said database to form links that terminate at said end of said representation of said first pathname, whereby a traversal of said path and a traversal of said links both terminate at said end where said unique identifier is stored.

3. A method of adding a computer file to a storage cluster, said method comprising:

receiving a first pathname identifying a computer file that uses a first pathname scheme of a first client software application;

calling a function of a namespace application and passing said first pathname, said first pathname including first pathname portions;

constructing a first representation in said namespace application of said first pathname identifying said computer file using said first pathname portions;

storing said computer file in said storage cluster and receiving a unique identifier from said storage cluster that uniquely identifies said computer file stored within said storage cluster;

receiving a second pathname identifying said computer file that uses a second pathname scheme of a second client software application;

calling said function of said namespace application and passing said second pathname, said second pathname including second pathname portions;

constructing a second representation in said namespace application of said second pathname identifying said computer file using said second pathname portions;

storing said unique identifier in conjunction with a termination of said representation of said first pathname and of said second pathname in said namespace application, whereby said computer file is uniquely represented in said namespace application by both of said representations.

4. A method as recited in claim 1 wherein said unique identifier is a universally unique identifier.

5. A method as recited in claim 1 wherein said representation is embodied by bindings in a bindings table.

6. A method as recited in claim 1 wherein said computer file may be retrieved from said storage cluster using said unique identifier alone.

7. A method as recited in claim 1 wherein said first pathname is not ordered from the most general to the most specific, said method further comprising:

reordering said constituent name portions in order to form said path.

8. A method as recited in claim 1 wherein said most specific name portion identifies a storage location of said end of said representation holding said stored unique identifier.

9. A method as recited in claim 1 wherein said parsing further includes:

parsing said first pathname into progressively more specific name portions.

10. A method as recited in claim 1 further comprising:

parsing said first pathname into said name portions, each name portion including a generality direction indicating in which direction said first pathname becomes more specific; and storing said generality direction with said name portion in said database.

11. A method as recited in claim 2 wherein said computer file may be retrieved from said storage cluster using said unique identifier alone.

12. A method as recited in claim 2 wherein said first pathname is not ordered from the most general to the most specific, said method further comprising:

reordering said constituent name portions in order to form said path.

13. A method as recited in claim 2 wherein said most specific name portion identifies a storage location of said end of said representation holding said stored unique identifier.

14. A method as recited in claim 2 wherein said parsing further includes:

parsing said first pathname into progressively more specific name portions.

15. A method as recited in claim 2 further comprising:

parsing said first pathname into said name portions, each name portion including a generality direction indicating in which direction said first pathname becomes more specific; and storing said generality direction with said name portion in said database.

16. A method as recited in claim 3 further comprising:

parsing said first pathname by said client application into its said constituent name portions, each name portion including a generality direction and a separator.

17. A method as recited in claim 3 further comprising:

using said generality directions and separators for each of said name portions to perform said step of constructing a first representation.

18. A method as recited in claim 3 wherein said unique identifier is a universally unique identifier.

* * * * *